(12) United States Patent
Chen (10) Patent No.: US 11,552,749 B2
(45) Date of Patent: *Jan. 10, 2023

(54) DATA TRANSMISSION METHOD AND TERMINAL DEVICE

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/345,489

(22) Filed: Jun. 11, 2021

(65) Prior Publication Data

US 2021/0306120 A1 Sep. 30, 2021

Related U.S. Application Data

(63) Continuation of application No. 16/613,039, filed as application No. PCT/CN2017/096908 on Aug. 10, 2017, now Pat. No. 11,063,710.

(51) Int. Cl.
*H04L 5/00* (2006.01)

(52) U.S. Cl.
CPC .................. *H04L 5/0007* (2013.01)

(58) Field of Classification Search
CPC .......................... H04W 72/413; H04W 74/085
See application file for complete search history.

(56) References Cited

U.S. PATENT DOCUMENTS

| 2009/0257398 A1 | 10/2009 | Koyanagi et al. |
| 2010/0118810 A1 | 5/2010 | Qu et al. |
| 2012/0113827 A1 | 5/2012 | Yamada et al. |

FOREIGN PATENT DOCUMENTS

| CN | 103916350 A | 7/2014 | |
| CN | 106341880 A | 1/2017 | |
| CN | 106506423 A | 3/2017 | |
| EP | 3531755 A1 * | 8/2019 | ........... H04B 7/0486 |
| RU | 2486680 C2 | 6/2013 | |

OTHER PUBLICATIONS

Korean Office Action with English Translation for KR Application 1020207000345 dated Nov. 15, 2021. (10 pages).

(Continued)

*Primary Examiner* — Kevin Kim
(74) *Attorney, Agent, or Firm* — Young Basile Hanlon & MacFarlane, P.C.

(57) ABSTRACT

Provided are a data transmission method and a network device, the method including: configuring a multiple access mode of uplink transmission for a terminal device; sending the multiple access mode of uplink transmission to the terminal device. The multiple access mode of uplink transmission is used for the terminal device to determine a multiplexing mode of a first uplink signal and a second uplink signal on a target time domain resource, wherein the first uplink signal and the second uplink signal are signals which the terminal device is scheduled to transmit on the target time domain resource simultaneously.

18 Claims, 2 Drawing Sheets

---

Determine a multiple access mode of uplink transmission — 210

Determine a multiplexing mode of a first uplink signal and a second uplink signal on a target time domain resource according to the multiple access mode of the uplink transmission — 220

Transmit the first uplink signal and/or the second uplink signal according to the multiplexing mode — 230

(56) References Cited

OTHER PUBLICATIONS

Chile Office Action with English Translation for CL Application 2019003634 dated Oct. 6, 2021. (25 pages).
Canadian Examination Report for CA Application 3063502 dated Sep. 16, 2021. (4 pages).
Extended European Search Report for EP Application 21183739.8 dated Aug. 4, 2021. (14 pages).
Indian Examination Report for IN Application 201917046362 dated Sep. 27, 2021. (6 pages).
Japanese Notice of Reasons for Refusal with English Translation for JP Application 2020501784 dated Jul. 20, 2021. (6 pages).
Singapore Invitation to Respond to Written Opinion for Grant for SG Application 11201910672X dated Aug. 3, 2021. (7 pages).
3GPP TSG RAN WG1 #88bis Spokane, USA, R1-1705324, Samsung, RACH Preamble Design, Apr. 3-7, 2017.
3GPP TSG RAN WG1 NR Ad-Hoc#2 Qingdao, P.R. China, R1-1710174, Guangdong OPPO Moblie Telecom, Uplink power control for NR, Jun. 27-30, 2017.
3GPP TSG-RAN WG2 NR Ad hoc#2 Qingdao, China, R2-1707357, Samsung, Indication signalling for uplink waveform, Jun. 27-29, 2017.
Russia First Office Action with English Translation for RU Application 2019138554/07(076058) dated Oct. 6, 2020.
Extended European Search Report for EP Application 17921068.7 dated Jun. 30, 2020.
3GPP TSG RAN WG1 NR Ad-Hoc#2; Qingdao, P.R. China Jun. 27-30, 2017; R1-1710090.
3GPP TSG RAN WG1 NR Ad-Hoc#2; Qingdao, P.R. China Jun. 27-30, 2017; R1-1710321.
3GPP TSG RAN WG1#88 R1-1703323; Athens, Greece, Feb. 13-17, 2017.
3GPP TSG RAN WG1 NR Ad-Hoc #2; Qingdao, P.R. China, Jun. 27-30, 2017; R1-1710899.
3GPP TS 36.211 V13.6.0 (Jun. 2017); Release 13; pp. 8-66.
MCC Support. Final Report of 3GPP TSG RAN WG1 #86bis v1.0.0. T1-1611081. Nov. 18, 2016 (Nov. 18, 2016), pp. 67 and 68.
International Search Report with English Translation for PCT/CN2017/096908 dated May 2, 2018.
Russia Grant Decision with English Translation for RU Application 2019138554/07(076058) dated Jan. 26, 2021.
China First Office Action with English Translation for CN Application 202010271399.2 dated May 6, 2021.
First Chile Examination Report with English Translation for Application No. 2019-003634 dated Jan. 19, 2021.
First Canadian Examination Report for Application No. 3,063,501 dated Jan. 8, 2021.
Israel Office Action with English Translation for IL Application 270718 dated Feb. 20, 2022. (3 pages).
Korean Notice of Final Rejection with English Translation for KR Application 1020207000345 dated May 23, 2022. (11 pages).

\* cited by examiner

DATA TRANSMISSION METHOD AND TERMINAL DEVICE

CROSS-REFERENCE TO RELATED APPLICATION(S)

This application is a continuation application of U.S. application Ser. No. 16/613,039, filed on Nov. 12, 2019, which is a 371 of International Application No. PCT/CN2017/096908, filed on Aug. 10, 2017, the entire disclosure of both of which are hereby incorporated by reference.

TECHNICAL FIELD

Implementations of the present disclosure relate to the field of communication, and more particularly, to a method for transmitting data and a terminal device.

BACKGROUND

At present, two uplink multiple access modes are introduced in uplink transmission of 5-Generation (5G) mobile communication technology: Discrete Fourier Transform-Spread-Orthogonal Frequency Division Multiplexing, DFT-S-OFDM) and Cyclic Prefix-Orthogonal Frequency Division Multiplexing (CP-OFDM). The former can only be used for uplink single-layer transmission, while the latter can be used for uplink single-layer or multi-layer transmission. Which multiple access mode a terminal uses may be configured by a network side according to an uplink channel quality of the terminal.

Meanwhile, multiple Transmission Reception Points (TRPs) in 5G may independently schedule one terminal to perform data transmission. For example, the terminal detects multiple Physical Downlink Control Channels (PDCCHs) from different TRPs within one time slot for scheduling multiple independent uplink data transmissions, and these independent uplink transmissions may be just scheduled in a same time slot.

However, since a terminal using the multiple access mode of DFT-S-OFDM cannot transmit multiple uplink signals simultaneously, a collision of multiple uplink signals may be caused when the multiple uplink signals are scheduled to be transmitted simultaneously, which may lead to a failure of uplink signal transmission, reducing reliability of data transmission.

SUMMARY

A method for transmitting data and a terminal device are provided.

In a first aspect, a method for transmitting data is provided, including: determining a multiple access mode of uplink transmission; determining a multiplexing mode of a first uplink signal and a second uplink signal on a target time domain resource according to the multiple access mode of the uplink transmission, wherein the first uplink signal and the second uplink signal are signals which a terminal device is scheduled to transmit on the target time domain resource simultaneously; and transmitting the first uplink signal and/or the second uplink signal according to the multiplexing mode.

In some possible implementations, the multiple access mode of the uplink transmission is a multiple access mode of Physical Uplink Shared Channel (PUSCH) transmission, or the multiple access mode of the uplink transmission is a multiple access mode of Physical Uplink Control Channel (PUCCH) transmission.

In some possible implementations, multiple access modes of the uplink transmission include Discrete Fourier Transform-Spread-Orthogonal Frequency Division Multiplexing (DFT-S-OFDM) and Cyclic Prefix-Orthogonal Frequency Division Multiplexing (CP-OFDM).

In some possible implementations, determining the multiplexing mode of the first uplink signal and the second uplink signal on the target time domain resource according to the multiple access mode of the uplink transmission, includes: transmitting the first uplink signal and the second uplink signal on the target time domain resource simultaneously, if the multiple access mode of the uplink transmission is CP-OFDM.

In some possible implementations, transmitting the first uplink signal and the second uplink signal on the target time domain resource simultaneously, if the multiple access mode of the uplink transmission is CP-OFDM, includes: transmitting the first uplink signal and the second uplink signal simultaneously on the target time domain resource by frequency division multiplexing, if a frequency domain resource occupied by the first uplink signal and a frequency domain resource occupied by the second uplink signal do not overlap.

In some possible implementations, transmitting the first uplink signal and the second uplink signal on the target time domain resource simultaneously, if the multiple access mode of the uplink transmission is CP-OFDM, includes: transmitting the first uplink signal and the second uplink signal simultaneously on an overlapping frequency domain resource, if a frequency domain resource occupied by the first uplink signal and a frequency domain resource occupied by the second uplink signal partially or completely overlap.

In some possible implementations, determining the multiplexing mode of the first uplink signal and the second uplink signal on the target time domain resource according to the multiple access mode of the uplink transmission, includes: determining a third uplink signal from the first uplink signal and the second uplink signal, if the multiple access mode of the uplink transmission is CP-OFDM and a frequency domain resource occupied by the first uplink signal and a frequency domain resource occupied by the second uplink signal partially or completely overlap; and sending the third uplink signal on an overlapping frequency domain resource.

In some possible implementations, determining the multiplexing mode of the first uplink signal and the second uplink signal on the target time domain resource according to the multiple access mode of the uplink transmission, includes: determining a third uplink signal from the first uplink signal and the second uplink signal, if the multiple access mode of the uplink transmission is DFT-S-OFDM; and sending the third uplink signal on the target time domain resource.

In some possible implementations, determining the third uplink signal from the first uplink signal and the second uplink signal, includes: determining a priority of the first uplink signal and a priority of the second uplink signal; and determining the third uplink signal according to the priority of the first uplink signal and the priority of the second uplink signal, from the first uplink signal and the second uplink signal.

In some possible implementations, determining the priority of the first uplink signal and the priority of the second uplink signal, includes: determining the priority of the first uplink signal and the priority of the second uplink signal in accordance with a first criterion according to a signal type to which the first uplink signal belongs and a signal type to which the second uplink signal belongs, wherein the first criterion includes a priority relation between multiple signal types, and the multiple signal types include the signal type to which the first uplink signal belongs and the signal type to which the second uplink signal belongs.

In some possible implementations, the multiple signal types include: Sounding Reference Signal (SRS), Physical Uplink Control Channel (PUCCH), Phase Tracking Reference Signal (PTRS) and Physical Uplink Shared Channel (PUSCH).

In some possible implementations, the first criterion includes at least one of the following criteria: the priority of the PUCCH is higher than that of the PUSCH, the priority of the PUCCH is higher than that of the SRS, the priority of the PUCCH is higher than that of the PTRS, the priority of the PTRS is higher than that of the SRS, and the priority of the PUSCH is higher than that of the SRS.

In some possible implementations, determining the priority of the first uplink signal and the priority of the second uplink signal, includes: determining the priority of the first uplink signal and the priority of the second uplink signal according to information carried by the first uplink signal and information carried by the second uplink signal, according to a second criterion, when both the first uplink signal and the second uplink signal belong to a first signal type, wherein the second criterion includes a priority relation between multiple uplink signals under the first signal type.

In some possible implementations, the second criterion includes at least one of the following criteria: the priority of PUCCH carrying Acknowledgement/Non-acknowledgement (ACK/NACK) information is higher than that of PUCCH carrying Channel State Information (CSI), the priority of PUSCH carrying Uplink Control Information (UCI) is higher than that of PUSCH not carrying UCI, and the priority of PUSCH carrying Ultra-Reliable Low Latency Communications (URLLC) data is higher than that of PUSCH carrying enhanced Mobile Broadband (eMBB) data.

In some possible implementations, determining the priority of the first uplink signal and the priority of the second uplink signal, includes: determining the priority of the first uplink signal and the priority of the second uplink signal according to scheduling signaling corresponding to the first uplink signal and scheduling signaling corresponding to the second uplink signal.

In some possible implementations, the scheduling signaling is Downlink Control Information (DCI), wherein the DCI includes indication information for indicating a priority of an uplink signal; among them, determining the priority of the first uplink signal and the priority of the second uplink signal according to the scheduling signaling corresponding to the first uplink signal and the scheduling signaling corresponding to the second uplink signal, includes: determining the priority of the first uplink signal and the priority of the second uplink signal, according to the indication information for indicating the priority of the uplink signal in the Downlink Control Information (DCI) corresponding to the first uplink signal and the indication information for indicating the priority of the uplink signal in the DCI corresponding to the second uplink signal.

In some possible implementations, the scheduling signaling is Downlink Control Information (DCI), wherein the DCI includes a Modulation and Coding Scheme (MCS) index value of an uplink signal, and the MCS index value is directly proportional to or inversely proportional to the priority of the uplink signal; wherein, determining the priority of the first uplink signal and the priority of the second uplink signal according to the scheduling signaling corresponding to the first uplink signal and the scheduling signaling corresponding to the second uplink signal, includes: determining the priority of the first uplink signal and the priority of the second uplink signal, according to the MCS index value in the Downlink Control Information (DCI) corresponding to the first uplink signal and the MCS index value in the DCI corresponding to the second uplink signal.

In some possible implementations, determining the priority of the first uplink signal and the priority of the second uplink signal, includes: determining the priority of the first uplink signal and the priority of the second uplink signal, according to a receiving sequence of the scheduling signaling corresponding to the first uplink signal and the scheduling signaling corresponding to the second uplink signal; wherein, the receiving sequence is directly proportional to or inversely proportional to a priority sequence of the first uplink signal and the second uplink signal.

In some possible implementations, determining the priority of the first uplink signal and the priority of the second uplink signal, includes: determining the priority of the first uplink signal and the priority of the second uplink signal, according to a cell type corresponding to the first uplink signal and a cell type corresponding to the second uplink signal; wherein, the priority of a serving cell of the terminal device is higher than that of cells other than the serving cell.

In some possible implementations, the first uplink signal and the second uplink signal are uplink signals that the terminal device is scheduled to transmit simultaneously within a same frequency domain resource set, wherein the frequency domain resource set includes any one of the following: a carrier set, a narrow bandwidth set, a subband set, and a Physical Resource Block (PRB) set.

In a second aspect, a terminal device is provided, including: a processing unit, used for determining a multiple access mode of uplink transmission; determining a multiplexing mode of a first uplink signal and a second uplink signal on a target time domain resource according to the multiple access mode of the uplink transmission, wherein the first uplink signal and the second uplink signal are signals which the terminal device is scheduled to transmit on the target time domain resource simultaneously; and a transceiving unit, used for transmitting the first uplink signal and/or the second uplink signal according to the multiplexing mode.

In a third aspect, a terminal device is provided, including: a processor, used for determining a multiple access mode of uplink transmission; determining a multiplexing mode of a first uplink signal and a second uplink signal on a target time domain resource according to the multiple access mode of the uplink transmission, wherein the first uplink signal and the second uplink signal are signals which the terminal device is scheduled to transmit on the target time domain resource simultaneously; and a transceiver, used for transmitting the first uplink signal and/or the second uplink signal, according to the multiplexing mode.

In a fourth aspect, a computer readable medium is provided, for storing a computer program, wherein the computer program includes instructions used for executing the method implementation of the above first aspect.

In a fifth aspect, a computer chip is provided, including an input interface, an output interface, at least one processor, and a memory, wherein, the processor is used for executing codes in the memory, and when the codes are executed, the processor may implement various processes performed by a terminal device in the method for transmitting data in the above first aspect and various implementations.

In a tenth aspect, a communication system is provided, including the above-mentioned terminal device.

DETAILED DESCRIPTION

Technical solutions in implementations of the present disclosure will be described with reference to the accompanying drawings.

Figure 1:
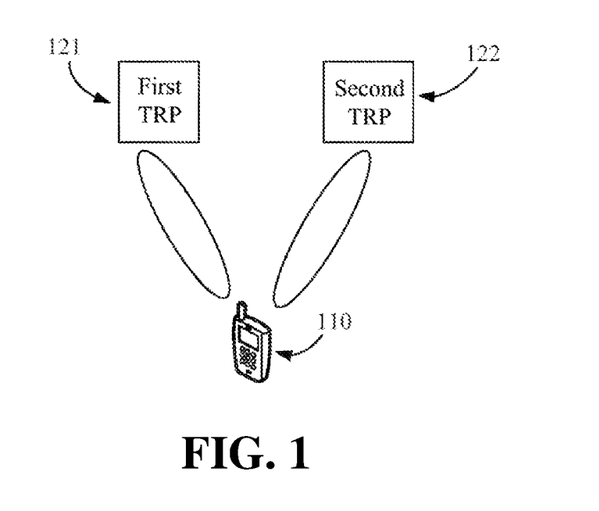
FIG. 1 is an example of an application scenario according to an implementation of the present disclosure.

FIG. 1 is an example diagram of a 5G communication system 100 according to an implementation of the present disclosure.

As shown in FIG. 1, a communication system 100 may include a terminal device 110, a first TRP 121 and a second TRP 122. The first TRP 121 and the second TRP 122 may respectively communicate with the terminal device 110 through an air interface. Specifically, the first TRP 121 and the second TRP 122 may independently schedule one terminal device 110 for data transmission.

For example, the terminal device 110 detects PDCCH from the first TRP 121 and the PDCCH from the second TRP 122 respectively within one time slot for scheduling multiple independent uplink data transmissions, and these independent uplink transmissions may be just scheduled in a same time slot.

However, since a terminal using DFT-S-OFDM cannot transmit multiple uplink signals simultaneously, when multiple uplink signals are scheduled to be transmitted simultaneously, a collision of the multiple uplink signals may be caused, which may lead to a failure of uplink signal transmission, reducing reliability of data transmission.

Implementations of the present disclosure provide an uplink signal transmission method, which enables the terminal device 110 to determine a transmission mode of multiple uplink signals currently scheduled to be transmitted simultaneously according to a currently used multiple access mode of uplink transmission, and thus an occurrence of a collision of the multiple uplink signals can be avoided.

Further, in a case of a single carrier, the terminal device 110 can determine an uplink signal to be transmitted according to priorities of the multiple different signals currently scheduled to be transmitted simultaneously, thereby an occurrence of a collision of the signals can be avoided, improving reliability of data transmission. In other words, the method of implementations of the present disclosure can avoid an occurrence of a collision of uplink signals, improving reliability of data transmission, under different scenarios of multiple access modes of uplink transmission.

It should be understood that the 5G communication system 100 is only an example for describing the implementation of the present disclosure. However, implementations of the present disclosure are not limited to this. In other words, technical solutions of implementations of the present disclosure can be applied to any communication system in which multiple network devices can independently schedule one terminal to performing data transmission.

The communication system may be, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, LTE Time Division Duplex (TDD), a Universal Mobile Telecommunication System (UMTS), or the like.

The present disclosure describes various implementations in connection with a network device and a terminal device.

The network device 120 may refer to any entity on a network side for sending or receiving signals. For example, it may be a user equipment of Machine Type Communication (MTC), a Base Transceiver Station (BTS) in GSM or CDMA, a base station (NodeB) in WCDMA, an Evolutional Node B (eNB or NodeB) in LTE, a base station device in a 5G network, etc.

In addition, the terminal device 110 may be any terminal device. Specifically, the terminal device 110 may communicate with one or more core networks through a radio access network (RAN), and may also be referred to as an access terminal, a User Equipment (UE), a subscriber unit, a subscriber station, a mobile station, a rover station, a remote station, a remote terminal, a mobile device, a user terminal, a terminal, a wireless communication device, a user agent, or a user device. For example, the terminal device may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, an on-board device, a wearable device, a terminal device in a 5G network or the like.

Figure 2:
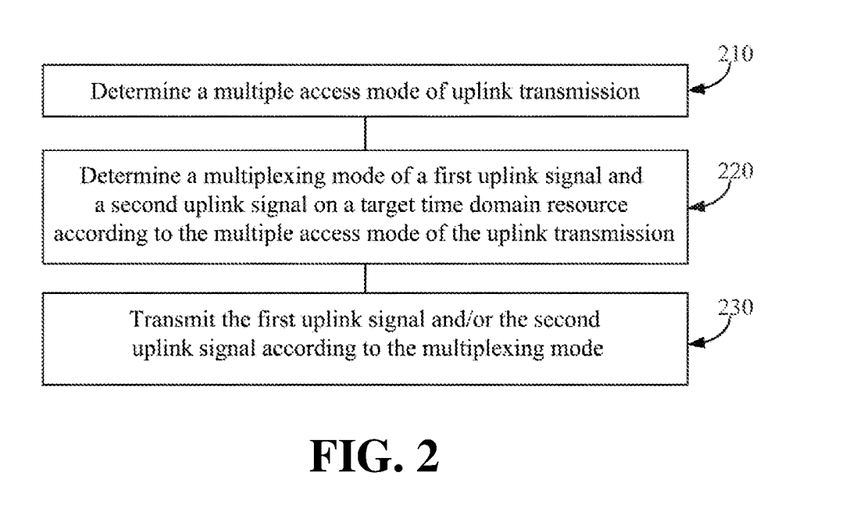
FIG. 2 is a schematic flowchart of a method for transmitting data according to an implementation of the present disclosure.

FIG. 2 is a schematic flowchart of a method for transmitting data according to an implementation of the present disclosure. As shown in FIG. 2, the method includes following acts 210, 220, 230.

In 210, a multiple access mode of uplink transmission is determined.

In 220, a multiplexing mode of a first uplink signal and a second uplink signal on a target time domain resource is determined according to the multiple access mode of the uplink transmission.

In 230, the first uplink signal and/or the second uplink signal are transmitted according to the multiplexing mode.

Specifically, the terminal device determines the multiple access mode of the uplink transmission; then, the terminal device determines the multiplexing mode of the first uplink signal and the second uplink signal on the target time domain resource according to the multiple access mode of the uplink transmission, wherein the first uplink signal and the second uplink signal are signals which the terminal device is scheduled to transmit on the target time domain resource simultaneously; finally, the terminal device transmits the first uplink signal and/or the second uplink signal according to the multiplexing mode.

In other words, when the terminal device needs to perform uplink transmission, the terminal device may determine a transmission mode of an uplink signal of the terminal device that is scheduled on the target time domain resource according to the multiple access mode of the uplink transmission.

It should be understood that the first uplink signal and the second uplink signal are only examples, and implementations of the present disclosure are not limited thereto. For example, the terminal device may be scheduled and need to transmit multiple uplink signals simultaneously on the target time domain resource, for example, the first uplink signal, the second uplink signal, and a fourth uplink signal, etc.

In the implementation of the present disclosure, the first uplink signal and the second uplink signal are uplink signals which the terminal device is scheduled to transmit simultaneously on the target time domain resource. Herein, the target time domain resource may include one or more symbols, or the target time domain resource may include one or more slots or mini-slots.

Optionally, the first uplink signal and the second uplink signal are also uplink signals which the terminal device is scheduled to transmit simultaneously within a same frequency domain resource set, wherein the frequency domain resource set includes any one of the following: a Carrier set, a narrow bandwidth (Bandwidth Part) set, a Subband set and a Physical Resource Block (PRB) set. Here, a Bandwidth Part may refer to a frequency band for user scheduling, a same subcarrier spacing may be used in one Bandwidth Part, and different Bandwidth Parts may use different subcarrier spacing.

Specifically, the target time domain resource corresponds to the above frequency domain resource set, and a time-frequency resource is formed by the target time domain resource and the above frequency domain resource set. The time-frequency resource may be composed of multiple continuous time-frequency resource units, wherein the time-frequency resource unit may be a resource unit (for example, for information transmission or resource allocation) in a communication system.

It should be noted that the frequency domain resource set listed above is merely an example description, and the present disclosure is not limited thereto. A form of the frequency domain resource set may be determined according to a distribution form of a time-frequency resource.

The following is a description of an implementation in which the terminal device determines the multi-access mode of the uplink transmission.

In implementations of the present disclosure, the above multiple access mode of the uplink transmission may be Discrete Fourier Transform-Spread-Orthogonal Frequency Division Multiplexing (DFT-S-OFDM), or may be Cyclic Prefix-Orthogonal Frequency Division Multiplexing (CP-OFDM). Among them, DFT-S-OFDM can only be used for uplink single-layer transmission, and CP-OFDM may be used for uplink single-layer or multi-layer transmission.

In addition, it can be understood that which multiple access mode the terminal device currently uses may be configured by a network device according to an uplink channel quality of the terminal device. In other words, the multiple access mode of the uplink transmission in the implementation of the present disclosure may be a multiple access mode of uplink channel transmission of the terminal device.

For example, the multiple access mode of the uplink transmission may be a multiple access mode of Physical Uplink Shared Channel (PUSCH) transmission.

For another example, the multiple access mode of the uplink transmission may be a multiple access mode of Physical Uplink Control Channel (PUCCH) transmission.

For example, assuming that both the multiple access mode of the PUSCH transmission and the multiple access mode of the PUCCH transmission configured by the network device are DFT-S-OFDM, the terminal device may directly determine that the multiple access mode of the uplink transmission is DFT-S-OFDM. Assuming that both the multiple access mode of the PUSCH transmission and the multiple access mode of the PUCCH transmission configured by the network device are CP-OFDM, the terminal device may directly determine that the multiple access mode of the uplink transmission is CP-OFDM.

It should be noted that assuming that the multiple access mode of the PUSCH transmission and the multiple access mode of the PUCCH transmission configured by the network device are different, optionally, the terminal device may use the multiple access mode of the PUCCH transmission as the multiple access mode of the uplink transmission by default. For example, assuming that the network device configures the multiple access mode of the PUSCH transmission to be CP-OFDM and the multiple access mode of the PUCCH transmission to be DFT-S-OFDM, the terminal device may determine that the multiple access mode of the uplink transmission is DFT-S-OFDM.

However, implementations of the present disclosure are not limited to this. For example, the terminal device may arbitrarily select one multiple access mode as the multiple access mode of the uplink transmission.

Since DFT-S-OFDM in the implementation of the present disclosure can only be used for uplink single-layer transmission, and CP-OFDM may be used for uplink single-layer or multi-layer transmission, the method for transmitting data according to the implementation of the present disclosure will be described below with respect to the situation where the multiple access mode of the uplink transmission is DFT-S-OFDM and the situation where the multiple access mode of the uplink transmission is CP-OFDM respectively.

As for the situation where the multiple access mode of the uplink transmission is CP-OFDM:

Optionally, if the multiple access mode of the uplink transmission is CP-OFDM, then the first uplink signal and the second uplink signal are simultaneously transmitted on the target time domain resource.

Specifically, since the target time domain resource may be composed of multiple continuous time-frequency resource units, wherein the time-frequency resource unit may be a resource unit (for example, for information transmission or resource allocation) in a communication system. Therefore, in implementations of the present disclosure, the terminal device may determine the multiplexing mode of the first uplink signal and the second uplink signal on the target time domain resource according to the frequency domain resource occupied by the first uplink signal and the frequency domain resource occupied by the second uplink signal.

For example, if the frequency domain resource occupied by the first uplink signal and the frequency domain resource occupied by the second uplink signal do not overlap, then the first uplink signal and the second uplink signal are simultaneously transmitted on the target time domain resource by frequency division multiplexing.

For another example, if the frequency domain resource occupied by the first uplink signal and the frequency domain resource occupied by the second uplink signal partially or completely overlap, then the first uplink signal and the second uplink signal are simultaneously transmitted on an overlapping frequency domain resource.

For another example, if the multiple access mode of the uplink transmission is CP-OFDM, and the frequency domain resource occupied by the first uplink signal and the frequency domain resource occupied by the second uplink signal partially or completely overlap, then a third uplink signal is determined from the first uplink signal and the second uplink signal; and the third uplink signal is sent on an overlapping frequency domain resource. That is, in implementations of the present disclosure, if the multiple access mode of the uplink transmission is CP-OFDM, and the frequency domain resource occupied by the first uplink signal and the frequency domain resource occupied by the second uplink signal partially or completely overlap, then the terminal device needs to select one uplink signal from the first uplink signal and the second uplink signal, and only send the selected uplink signal through the overlapping frequency domain resource.

It should be understood that if the frequency domain resource occupied by the first uplink signal and the frequency domain resource occupied by the second uplink signal partially overlap, then the terminal device may also transmit the first uplink signal and the second uplink signal simultaneously by frequency division multiplexing on a non-overlapping frequency domain resource, which is not specifically restricted in the present disclosure.

As for the situation where the multiple access mode of the uplink transmission is DFT-S-OFDM:

Optionally, if the multiple access mode of the uplink transmission is DFT-S-OFDM, then a third uplink signal is determined from the first uplink signal and the second uplink signal; and the third uplink signal is sent on the target time domain resource.

Specifically, if the multiple access mode of the uplink transmission is DFT-S-OFDM, then the terminal device needs to select one uplink signal from the first uplink signal and the second uplink signal, and only send the selected uplink signal on the target time domain resource.

It should be noted that in implementations of the present disclosure, under a scenario that the multiple access mode of the uplink transmission is DFT-S-OFDM, an implementation that the terminal device selects the third uplink signal, may be the same as or different from the implementation that the terminal device selects the third uplink signal under the scenario that the multiple access mode of the uplink transmission is CP-OFDM and the frequency domain resource occupied by the first uplink signal and the frequency domain resource occupied by the second uplink signal partially or completely overlap, which is not specifically restricted in implementations of the present disclosure.

The following is a description of the implementation that the terminal device selects the third uplink signal in an implementation of the present disclosure.

Optionally, the terminal device may determine a priority of the first uplink signal and a priority of the second uplink signal, and determine the third uplink signal from the first uplink signal and the second uplink signal according to the priority of the first uplink signal and the priority of the second uplink signal.

As an implementation, illustratively, the terminal device may determine the priority of the first uplink signal and the priority of the second uplink signal in accordance with a first criterion according to a signal type to which the first uplink signal belongs and a signal type to which the second uplink signal belongs, wherein the first criterion includes a priority relation between multiple signal types including the signal type to which the first uplink signal belongs and the signal type to which the second uplink signal belongs.

Herein, the multiple signal types may include: Sounding Reference Signal (SRS), Physical Uplink Control Channel (PUCCH), Phase Tracking Reference Signal (PTRS) and Physical Uplink Shared Channel (PUSCH).

The first criterion includes at least one of the following criteria: the priority of the PUCCH is higher than that of the PUSCH, the priority of the PUCCH is higher than that of the SRS, the priority of the PUCCH is higher than that of the PTRS, the priority of the PTRS is higher than that of the SRS, and the priority of the PUSCH is higher than that of the SRS.

Further, when both the first uplink signal and the second uplink signal belong to a first signal type, the priority of the first uplink signal and the priority of the second uplink signal are determined in accordance with a second criterion according to information carried by the first uplink signal and information carried by the second uplink signal, wherein the second criterion includes a priority relation between multiple uplink signals under the first signal type.

Herein, the second criterion includes at least one of the following criteria: the priority of PUCCH carrying Acknowledgement/Non-acknowledgement (ACK/NACK) information is higher than that of PUCCH carrying Channel State Information (CSI), the priority of PUSCH carrying Uplink Control Information (UCI) is higher than that of PUSCH not carrying UCI, and the priority of PUSCH carrying Ultra-Reliable Low Latency Communications (URLLC) data is higher than that of PUSCH carrying enhanced Mobile Broadband (eMBB) data.

As another implementation, illustratively, the terminal device may determine the priority of the first uplink signal and the priority of the second uplink signal according to scheduling signaling corresponding to the first uplink signal and scheduling signaling corresponding to the second uplink signal.

For example, the scheduling signaling is Downlink Control Information (DCI), wherein the DCI includes indication information for indicating a priority of an uplink signal. The terminal device may determine the priority of the first uplink signal and the priority of the second uplink signal according to the indication information for indicating the priority of the uplink signal in the Downlink Control Information (DCI) corresponding to the first uplink signal and the indication information for indicating the priority of the uplink signal in the DCI corresponding to the second uplink signal.

For another example, the scheduling signaling is Downlink Control Information (DCI), wherein the DCI includes a Modulation and Coding Scheme (MCS) index value of the uplink signal, and the MCS index value is directly proportional to or inversely proportional to the priority of the uplink signal. The terminal device may determine the priority of the first uplink signal and the priority of the second uplink signal according to the MCS index value in the Downlink Control Information (DCI) corresponding to the first uplink signal and the MCS index value in the DCI corresponding to the second uplink signal.

As another implementation, illustratively, the terminal device may determine the priority of the first uplink signal and the priority of the second uplink signal according to a receiving sequence of the scheduling signaling corresponding to the first uplink signal and the scheduling signaling corresponding to the second uplink signal; wherein the receiving sequence is directly proportional to or inversely proportional to a priority sequence of the first uplink signal and the second uplink signal.

As another implementation, illustratively, the terminal device may determine the priority of the first uplink signal and the priority of the second uplink signal according to a cell type corresponding to the first uplink signal and a cell type corresponding to the second uplink signal; wherein the priority of a serving cell of the terminal device is higher than that of cells other than the serving cell.

Figure 3:
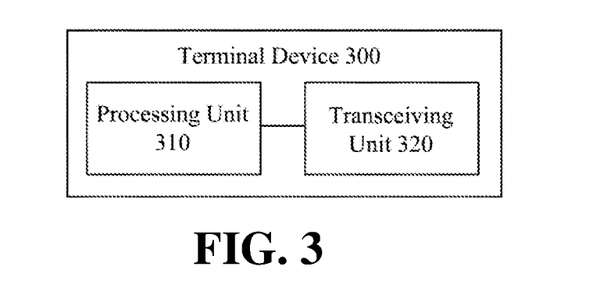
FIG. 3 is a schematic block diagram of a terminal device according to an implementation of the present disclosure.

FIG. 3 is a schematic block diagram of a terminal device 300 according to an implementation of the present disclosure.

As shown in FIG. 3, the terminal device 300 includes a processing unit 310 and a transceiving unit 320.

The processing unit 310 is used for determining a multiple access mode of uplink transmission; and determining a multiplexing mode of a first uplink signal and a second uplink signal on a target time domain resource according to the multiple access mode of the uplink transmission, wherein the first uplink signal and the second uplink signal are signals which the terminal device is scheduled to transmit on the target time domain resource simultaneously.

The transceiving unit 320 is used for transmitting the first uplink signal and/or the second uplink signal according to the multiplexing mode.

Optionally, the multiple access mode of the uplink transmission is a multiple access mode of Physical Uplink Shared Channel (PUSCH) transmission, or the multiple access mode of the uplink transmission is a multiple access mode of Physical Uplink Control Channel (PUCCH) transmission.

Optionally, multiple access modes of the uplink transmission include Discrete Fourier Transform-Spread-Orthogonal Frequency Division Multiplexing (DFT-S-OFDM) and Cyclic Prefix-Orthogonal Frequency Division Multiplexing (CP-OFDM).

Optionally, the transceiving unit 320 is specifically used for: transmitting the first uplink signal and the second uplink signal simultaneously on the target time domain resource, if the multiple access mode of the uplink transmission is CP-OFDM.

Optionally, the transceiving unit 320 is specifically used for: transmitting the first uplink signal and the second uplink signal simultaneously on the target time domain resource by frequency division multiplexing, if a frequency domain resource occupied by the first uplink signal and a frequency domain resource occupied by the second uplink signal do not overlap.

Optionally, the transceiving unit 320 is specifically used for: transmitting the first uplink signal and the second uplink signal simultaneously on an overlapping frequency domain resource, if a frequency domain resource occupied by the first uplink signal and a frequency domain resource occupied by the second uplink signal partially or completely overlap.

Optionally, the processing unit 310 is specifically used for: determining a third uplink signal from the first uplink signal and the second uplink signal, if the multiple access mode of the uplink transmission is CP-OFDM and a frequency domain resource occupied by the first uplink signal and a frequency domain resource occupied by the second uplink signal partially or completely overlap; and sending the third uplink signal on an overlapping frequency domain resource through the transceiving unit 320.

Optionally, the processing unit 310 is specifically used for: determining a third uplink signal from the first uplink signal and the second uplink signal, if the multiple access mode of the uplink transmission is DFT-S-OFDM; and sending the third uplink signal on the target time domain resource through the transceiving unit 320.

Optionally, the processing unit 310 is more specifically used for: determining a priority of the first uplink signal and a priority of the second uplink signal; and determining the third uplink signal from the first uplink signal and the second uplink signal according to the priority of the first uplink signal and the priority of the second uplink signal.

Optionally, the processing unit 310 is more specifically used for: determining a priority of the first uplink signal and a priority of the second uplink signal in accordance with a first criterion, according to a signal type to which the first uplink signal belongs and a signal type to which the second uplink signal belongs, wherein the first criterion includes a priority relation between multiple signal types, and the multiple signal types include the signal type to which the first uplink signal belongs and the signal type to which the second uplink signal belongs.

Optionally, the multiple signal types include: Sounding Reference Signal (SRS), Physical Uplink Control Channel (PUCCH), Phase Tracking Reference Signal (PTRS) and Physical Uplink Shared Channel (PUSCH).

Optionally, the first criterion includes at least one of the following criteria: the priority of the PUCCH is higher than that of the PUSCH, the priority of the PUCCH is higher than that of the SRS, the priority of the PUCCH is higher than that of the PTRS, the priority of the PTRS is higher than that of the SRS, and the priority of the PUSCH is higher than that of the SRS.

Optionally, the processing unit 310 is more specifically used for: determining a priority of the first uplink signal and a priority of the second uplink signal in accordance with a second criterion according to information carried by the first uplink signal and information carried by the second uplink signal, when both the first uplink signal and the second uplink signal belong to a first signal type, wherein the second criterion includes a priority relation between multiple uplink signals under the first signal type.

Optionally, the second criterion includes at least one of the following criteria: the priority of PUCCH carrying Acknowledgement/Non-acknowledgement (ACK/NACK) information is higher than that of PUCCH carrying Channel State Information (CSI), the priority of PUSCH carrying Uplink Control Information (UCI) is higher than that of PUSCH not carrying UCI, and the priority of PUSCH carrying Ultra-Reliable Low Latency Communications (URLLC) data is higher than that of PUSCH carrying enhanced Mobile Broadband (eMBB) data.

Optionally, the processing unit 310 is more specifically used for: determining a priority of the first uplink signal and a priority of the second uplink signal, according to scheduling signaling corresponding to the first uplink signal and scheduling signaling corresponding to the second uplink signal.

Optionally, the scheduling signaling is Downlink Control Information (DCI), wherein the DCI includes indication information for indicating a priority of an uplink signal; wherein, the processing unit 310 is more specifically used for: determining the priority of the first uplink signal and the priority of the second uplink signal according to the indication information for indicating the priority of the uplink signal in the Downlink Control Information (DCI) corresponding to the first uplink signal and the indication information for indicating the priority of the uplink signal in the DCI corresponding to the second uplink signal.

Optionally, the scheduling signaling is Downlink Control Information (DCI), wherein the DCI includes a Modulation and Coding Scheme (MCS) index value of the uplink signal, and the MCS index value is directly proportional to or inversely proportional to the priority of the uplink signal; wherein, the processing unit 310 is more specifically used for: determining the priority of the first uplink signal and the priority of the second uplink signal, according to the MCS index value in the Downlink Control Information (DCI) corresponding to the first uplink signal and the MCS index value in the DCI corresponding to the second uplink signal.

Optionally, the processing unit 310 is more specifically used for: determining a priority of the first uplink signal and a priority of the second uplink signal according to a receiving sequence of scheduling signaling corresponding to the first uplink signal and scheduling signaling corresponding to the second uplink signal; wherein the receiving sequence is directly proportional to or inversely proportional to a priority sequence of the first uplink signal and the second uplink signal.

Optionally, the processing unit 310 is more specifically used for: determining a priority of the first uplink signal and a priority of the second uplink signal according to a cell type corresponding to the first uplink signal and a cell type corresponding to the second uplink signal; wherein the priority of a serving cell of the terminal device is higher than that of cells other than the serving cell.

Optionally, the first uplink signal and the second uplink signal are uplink signals which the terminal device is scheduled to transmit simultaneously within a same frequency domain resource set, wherein the frequency domain resource set includes any one of the following: a carrier set, a narrow bandwidth set, a subband set, and a Physical Resource Block (PRB) set.

Figure 4:
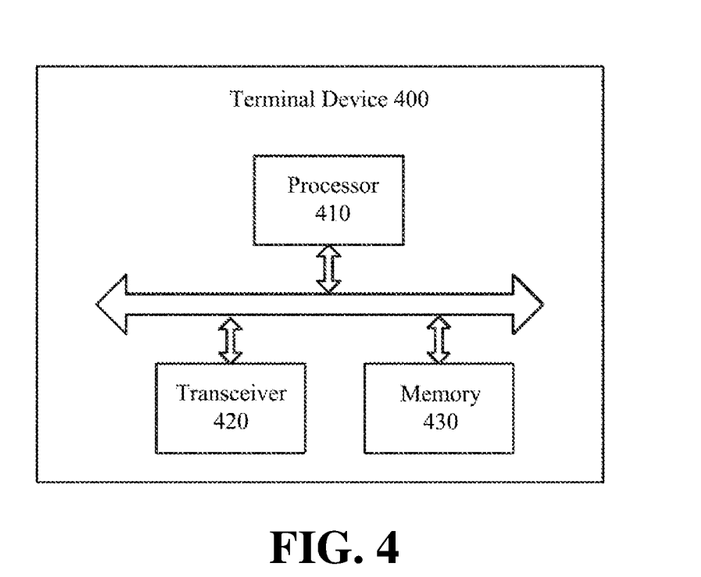
FIG. 4 is another schematic block diagram of a terminal device according to an implementation of the present disclosure.

It should be noted that in the implementation of the present disclosure, the processing unit 310 may be implemented by a processor, and the transceiving unit 320 may be implemented by a transceiver. As shown in FIG. 4, a terminal device 400 may include a processor 410, a transceiver 420, and a memory 430. The storage 430 may be used for storing indication information, or may be used for storing codes, instructions, etc., executed by the processor 410. The various components in the terminal device 400 are connected by a bus system. The bus system includes a power bus, a control bus and a status signal bus in addition to a data bus.

The terminal device 400 shown in FIG. 4 can implement the various processes implemented by the terminal device in the method implementation of FIG. 2 described above. In order to avoid duplication, the details will not be repeated here.

That is, the method implementation in implementations of the present disclosure can be applied to or implemented by a processor. The processor may be an integrated circuit chip with signal processing capability. In the implementation process, the actions of the method implementations described above may be accomplished by integrated logic circuits of hardware in the processor or instructions in the form of software. The above processor may be a general purpose processor, a digital signal processor (DSP), an application specific integrated circuit (ASIC), a field programmable gate array (FPGA) or other programmable logic devices, a transistor logic device, or a discrete hardware component, which can implement or perform the disclosed methods, acts and logical block diagrams in the implementations of the present disclosure. The general purpose processor may be a microprocessor or the processor may be any conventional processor or the like. The acts of the methods disclosed in combination with the implementations of the present disclosure may be directly embodied as to be executed and accomplished by a hardware decoding processor or by a combination of hardware and software modules in a decoding processor. Software modules may be located in a typical storage medium in the art, such as, a random access memory (RAM), a flash memory, a read-only memory, a programmable read-only memory, an electrical erasable programmable memory, or a register. The storage medium is located in the memory, and the processor reads the information in the memory and accomplishes the actions of the above method in combination with its hardware.

It should be understood that the memory in the implementations of the present disclosure may be a volatile memory or a non-volatile memory, or it may include both volatile and non-volatile memory. The non-transitory memory may be a read-only memory (ROM), a programmable ROM (PROM), an erasable PROM (EPROM), an electrically erasable EPROM (EEPROM), or a flash memory. The transitory memory may be a Random Access Memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synch link DRAM (SLDRAM), and a Direct Rambus RAM (DR RAM). It should be noted that the memories of the systems and methods described herein are intended to include, but are not limited to, these and any other suitable types of memories.

Finally, it should be noted that the terms used in the implementations of the present disclosure and the appended claims are for the purpose of describing specific implementations only and are not intended to limit the implementations of the present disclosure.

For example, the singular forms "a", "said", and "the" used in the implementations of the present disclosure and the appended claims are also intended to include the plural forms unless the context clearly indicates other meanings.

For another example, the terms first type cell group and second type cell group may be used in the implementations of the present disclosure, but these types of cell groups should not be limited to these terms. These terms are only used to distinguish types of cell groups from one another.

For another example, depending on the context, the word "when" as used herein may be interpreted as "if" or "in case" or "while" or "in response to determining" or "in response to detecting". Similarly, depending on the context, the phrase "if determining" or "if detecting (a stated condition or event)" may be interpreted as "when . . . is determined" or "in response to determining" or "when (a stated condition or event) is detected" or "in response to detecting (a stated condition or event)".

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on a specific application and design constraint of the technical solution. One skilled in the art may use different methods to implement the described functions for each particular application, but such implementation should not be considered to be beyond the scope of implementations of the present disclosure.

Those skilled in the art may clearly understand that for convenience and conciseness of description, the specific working process of the system, device and unit described above may refer to the corresponding process in the implementations of methods described above, and details are not described herein again.

In several implementations provided by the present disclosure, it should be understood that the disclosed systems, devices and methods may be implemented in other ways. For example, the apparatus implementations described above are only illustrative, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Parts or all of the units can be selected according to actual needs to achieve the purpose of the implementations of the present disclosure.

In addition, various functional units in the implementations of the present disclosure may be integrated in one processing unit, or various units may be physically presented separately, or two or more units may be integrated in one unit.

The functional units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product stored in a storage medium, including several instructions for causing a computer device (which may be a personal computer, a server, or a network device, etc.) to perform all or parts of the acts of the methods described in various implementations of the present disclosure. The aforementioned storage medium includes a medium capable of storing program codes, such as, a U disk, a mobile hard disk, a read-only memory (ROM), a magnetic disk or an optical disk, etc.

What are described above are merely the specific implementations of the implementations of the present disclosure, but the protection scope of the implementations of the present disclosure is not limited thereto. Any change or substation that can be easily conceived by a person skilled in the art within the technical scope disclosed by the implementations of the present disclosure shall be included within the protection scope of the implementations of the present disclosure. Therefore, the scope of protection of the implementations of the present disclosure should be subject to the scope of protection of the claims.

What is claimed is:

1. A method for transmitting data, comprising:
    configuring a multiple access mode of uplink transmission for a terminal device; and
    sending the multiple access mode of uplink transmission to the terminal device;
    wherein the multiple access mode of uplink transmission is used for the terminal device to determine a multiplexing mode of a first uplink signal and a second uplink signal on a target time domain resource, wherein the first uplink signal and the second uplink signal are signals which the terminal device is scheduled to transmit on the target time domain resource simultaneously.

2. The method according to claim 1, wherein multiple access modes of the uplink transmission comprise Discrete Fourier Transform-Spread-Orthogonal Frequency Division Multiplexing (DFT-S-OFDM) and Cyclic Prefix-Orthogonal Frequency Division Multiplexing (CP-OFDM).

3. The method according to claim 1, wherein the first uplink signal and the second uplink signal are sent simultaneously on the target time domain resource, when the multiple access mode of the uplink transmission is CP-OFDM.

4. The method according to claim 3, wherein the first uplink signal and the second uplink signal are sent simultaneously on the target time domain resource, when the multiple access mode of the uplink transmission is CP-OFDM, comprises at least one of:
    the first uplink signal and the second uplink signal are sent simultaneously on the target time domain resource by frequency division multiplexing, when a frequency domain resource occupied by the first uplink signal and a frequency domain resource occupied by the second uplink signal do not overlap; or
    the first uplink signal and the second uplink signal are sent simultaneously on an overlapping frequency domain resource, when a frequency domain resource occupied by the first uplink signal and a frequency domain resource occupied by the second uplink signal partially or completely overlap.

5. The method according to claim 1, wherein a third uplink signal from the first uplink signal and the second uplink signal is determined, when the multiple access mode of the uplink transmission is DFT-S-OFDM; and the third uplink signal is sent on the target time domain resource.

6. The method according to claim 5, wherein a priority of the first uplink signal and a priority of the second uplink signal is determined and sent to the terminal device, and the third uplink signal is determined from the first uplink signal and the second uplink signal according to the priority of the first uplink signal and the priority of the second uplink signal.

7. The method according to claim 6, wherein the priority of the first uplink signal and the priority of the second uplink signal is determined in accordance with a first criterion according to a signal type to which the first uplink signal belongs and a signal type to which the second uplink signal belongs, wherein the first criterion comprises a priority relation between multiple signal types, and the multiple signal types comprise the signal type to which the first uplink signal belongs and the signal type to which the second uplink signal belongs.

8. The method according to claim 6, wherein the priority of the first uplink signal and the priority of the second uplink signal is determined in accordance with a second criterion according to information carried by the first uplink signal and information carried by the second uplink signal, when both the first uplink signal and the second uplink signal belong to a first signal type, wherein the second criterion comprises a priority relation between multiple uplink signals under the first signal type.

9. The method according to claim 6, wherein the priority of the first uplink signal and the priority of the second uplink signal is determined according to scheduling signaling corresponding to the first uplink signal and scheduling signaling corresponding to the second uplink signal.

10. The method according to claim 1, wherein,
    the first uplink signal and the second uplink signal are uplink signals which the terminal device is scheduled to transmit simultaneously within a same frequency domain resource set, wherein the frequency domain resource set comprises any one of the following:
    a carrier set, a narrow bandwidth set, a subband set, and a Physical Resource Block (PRB) set.

11. A network device, comprising:
a processor, used for configuring a multiple access mode of uplink transmission for a terminal device; and
a transceiver, used for sending the multiple access mode of uplink transmission to the terminal device;
wherein the multiple access mode of uplink transmission is used for the terminal device to determine a multiplexing mode of a first uplink signal and a second uplink signal on a target time domain resource, wherein the first uplink signal and the second uplink signal are signals which the terminal device is scheduled to transmit on the target time domain resource simultaneously.

12. The network device according to claim 11, wherein multiple access modes of the uplink transmission comprise Discrete Fourier Transform-Spread-Orthogonal Frequency Division Multiplexing (DFT-S-OFDM) and Cyclic Prefix-Orthogonal Frequency Division Multiplexing (CP-OFDM).

13. The network device according to claim 11, wherein the first uplink signal and the second uplink signal are sent simultaneously on the target time domain resource, when the multiple access mode of the uplink transmission is CP-OFDM.

14. The network device according to claim 11, wherein a third uplink signal from the first uplink signal and the second uplink signal is determined, when the multiple access mode of the uplink transmission is DFT-S-OFDM; and the third uplink signal is sent on the target time domain resource.

15. The network device according to claim 14, wherein the processor is used for: determining a priority of the first uplink signal and a priority of the second uplink signal;
the transceiver is used for sending the priority of the first uplink signal and the priority of the second uplink signal to the terminal device; and
the third uplink signal is determined from the first uplink signal and the second uplink signal according to the priority of the first uplink signal and the priority of the second uplink signal.

16. The network device according to claim 15, wherein the processor is used for:
determining the priority of the first uplink signal and the priority of the second uplink signal in accordance with a first criterion according to a signal type to which the first uplink signal belongs and a signal type to which the second uplink signal belongs, wherein the first criterion comprises a priority relation between multiple signal types, and the multiple signal types comprise the signal type to which the first uplink signal belongs and the signal type to which the second uplink signal belongs.

17. The network device according to claim 15, wherein the processor is used for:
determining the priority of the first uplink signal and the priority of the second uplink signal in accordance with a second criterion according to information carried by the first uplink signal and information carried by the second uplink signal, when both the first uplink signal and the second uplink signal belong to a first signal type, wherein the second criterion comprises a priority relation between multiple uplink signals under the first signal type.

18. The network device according to claim 15, wherein the processor is used for:
determining the priority of the first uplink signal and the priority of the second uplink signal according to scheduling signaling corresponding to the first uplink signal and scheduling signaling corresponding to the second uplink signal.

* * * * *